US007460228B2

(12) United States Patent
Takahashi et al.

(10) Patent No.: US 7,460,228 B2
(45) Date of Patent: Dec. 2, 2008

(54) FAST PARTICLE GENERATING APPARATUS

(75) Inventors: Hironori Takahashi, Hamamatsu (JP); Masatoshi Fujimoto, Hamamatsu (JP); Shin-Ichiro Aoshima, Iwata (JP)

(73) Assignee: Japan Science and Technology Agency, Saitama (JP)

( * ) Notice: Subject to any disclaimer, the term of this patent is extended or adjusted under 35 U.S.C. 154(b) by 228 days.

(21) Appl. No.: 10/553,432

(22) PCT Filed: Apr. 22, 2004

(86) PCT No.: PCT/JP2004/005828

§ 371 (c)(1),
(2), (4) Date: Jun. 12, 2006

(87) PCT Pub. No.: WO2004/095473

PCT Pub. Date: Nov. 4, 2004

(65) Prior Publication Data

US 2007/0176078 A1 Aug. 2, 2007

(30) Foreign Application Priority Data

Apr. 23, 2003 (JP) ............................ 2003-119029

(51) Int. Cl.
*G01J 3/00* (2006.01)

(52) U.S. Cl. ...................................................... 356/326

(58) Field of Classification Search .................. 356/326
See application file for complete search history.

(56) References Cited

U.S. PATENT DOCUMENTS

| | | | | |
|---|---|---|---|---|
| 7,230,258 | B2 * | 6/2007 | Ruzic et al. | 250/504 R |
| 2003/0152186 | A1 * | 8/2003 | Jurczyk et al. | 376/109 |

FOREIGN PATENT DOCUMENTS

| | | |
|---|---|---|
| DE | 29 22 128 | 11/1980 |
| DE | 3439287 | 9/1985 |
| GB | 2 080 027 | 1/1982 |
| JP | 2002-107494 A | 4/2002 |

(Continued)

OTHER PUBLICATIONS

PCT International Search Report from International Application No. PCT/JP2004/005828 dated Apr. 22, 2004.
Physical Review Letters vol. 84, No. 18, pp. 4108-4111 (May 1, 2000).

(Continued)

*Primary Examiner*—Kara E Geisel
(74) *Attorney, Agent, or Firm*—Patterson & Sheridan, L.L.P.

(57) ABSTRACT

A laser beam emitted from a laser source is projected onto a target set in a vacuum chamber while being focused by a focusing optical system. This results in generating fast particles, such as protons and emitting the particles from the target. A light measuring device measures plasma emission from the target upon in-focus irradiation with the laser beam and an analyzing device analyzes a measurement signal therefrom to assess a generation state of fast particles. Then the focusing optical system and target are controlled through optical system moving mechanism and target moving mechanism on the basis of the result of the analysis and feedback control is performed on the generation state of fast particles in the target. This realizes a fast particle generating apparatus capable of monitoring the generation state of fast particles in real time and thereby efficiently generating the fast particles.

4 Claims, 3 Drawing Sheets

FOREIGN PATENT DOCUMENTS

| | | | |
|---|---|---|---|
| JP | 2002-107499 | A | 4/2002 |
| JP | 2002-195961 | A | 7/2002 |
| JP | 2002-214400 | A | 7/2002 |

OTHER PUBLICATIONS

Nuclear Instruments and Methods in Physics Research B 183 (2001).

EP Search Report, Application No. EP 04728960.8, dated Apr. 21, 2008.

* cited by examiner

FAST PARTICLE GENERATING APPARATUS

TECHNICAL FIELD

The present invention relates to a fast particle generating apparatus for emitting particles such as protons at high speed from a target.

BACKGROUND ART

It is feasible to realize a fast particle source to emit particles such as electrons, protons, or deuterons at high speed from a target, by focusing a high-intensity laser on the target in vacuum (for example, reference is made to Document 1 "A. Maksimchuk, S. Gu, K. Flippo, and D. Umstadter, "Forward Ion Acceleration in Thin Films Driven by a High-Intensity Laser," Phys. Rev. Lett. Vol. 84, pp. 4108-4111 (2000)" and Document 2 "I. Spencer et al., "Laser generation of proton beams for the production of short-lived positron emitting radioisotopes," Nucl. Inst. and Meth. in Phys. Res. B Vol. 183, pp. 449-458 (2001)"). Such fast particle sources are applicable to various devices for generation of isotopes and others.

An example of such application is a generating apparatus of radioisotopes used in diagnoses with PET (Positron Emission Tomography) apparatus. The PET diagnoses use agents containing short-lived radioisotopes such as $^{11}C$, $^{13}N$, and $^{15}O$ which emit positrons. These radioisotopes can be generated, for example, by making use of the (p,n) reaction with fast protons, the (d,n) reaction with fast deuterons, or the like.

The radioisotopes are generated, mainly using fast proton beams or the like supplied from a cyclotron accelerator. In use of such a cyclotron, the system is large in scale and large-scale radiation shield equipment is needed, which poses a problem in terms of widespread use of the PET diagnoses. In contrast to it, if the cyclotron accelerator as a fast particle source is replaced with the aforementioned fast particle generating apparatus making use of the high-intensity laser beam, it will enable downsizing of the system including the radiation shield equipment.

DISCLOSURE OF THE INVENTION

For generating fast particles with use of the high-intensity laser beam, it is important to project the laser beam in focus on a sufficiently small region of the target. There is a configuration for observing the focus state of the laser beam with a magnifying optical system and CCD camera, as a configuration for monitoring the focus state of the laser beam projected on the target or a generation state of fast particles thereby. In this configuration, however, where the target material is set at the focus point of the laser beam, it is infeasible to directly observe the focus point.

Another available configuration is one to measure generated fast particles with a solid trajectory detector using CR-39 plastic. Specifically, as fast particles are incident into the plastic of the trajectory detector, they leave invisible flaws inside. Then the plastic is subjected to etching in an alkali solution for several hours, and the aforementioned flaws made by fast particles are preferentially etched to appear as etch pits. This allows us to evaluate the generation state of fast particles. However, this configuration does not allow us to monitor the generation state of fast particles in real time.

Another conceivable configuration is one using the Thomson parabola ion analyzer for applying a magnetic field to fast particles and measuring the energy of particles from the orbit of particles bent by the magnetic field, but it is a system with strong magnets inside and thus has a problem of poor operability.

The present invention has been accomplished in order to solve the above problems and an object of the invention is to provide a fast particle generating apparatus capable of monitoring the generation state of fast particles and efficiently generating fast particles.

In order to achieve the above object, a fast particle generating apparatus according to the present invention comprises (1) a laser source for emitting a laser beam at a predetermined intensity; (2) a target for generating and emitting fast particles when irradiated with the laser beam in focus thereon; (3) a focusing optical system for focusing the laser beam emitted from the laser source, on the target; (4) light measuring means for measuring light generated in the target upon irradiation with the laser beam and outputting a measurement signal; (5) analyzing means for performing an analysis on a generation state of fast particles in the target, based on the measurement signal from the light measuring means; and (6) control means for controlling at least one of the laser source, the target, and the focusing optical system on the basis of a result of the analysis by the analyzing means, thereby controlling the generation state of fast particles in the target.

As the target is irradiated with the high-intensity laser beam from the laser source in focus thereon, the target material is changed into a plasma and plasma emission occurs at a wavelength different from that of the laser beam. The plasma emission differs in intensity, wavelength, etc. depending upon the focus state of the laser beam and the generation state of fast particles. The above-described fast particle generating apparatus is configured to measure the light from the target by the light measuring means. This makes it feasible to monitor the generation state of fast particles, e.g., an amount of particles generated, in real time. By performing feedback control of the generating apparatus by making use of the monitor result, it becomes feasible to efficiently generate fast particles on a stable basis.

The control means is preferably a moving mechanism for controlling movement of the target or the focusing optical system. This configuration permits the control means to suitably perform the feedback control on the generation state of fast particles in the target. The focusing optical system is preferably an off-axis parabolic mirror.

The light measuring means may be configured to have a spectrometer for spectroscopically measuring the light generated in the target. This permits the light measuring means to measure the spectral intensity with respect to the wavelength of the light generated in the target, whereby the generation state of fast particles in the target can be securely monitored.

BEST MODE FOR CARRYING OUT THE INVENTION

Figure 1:
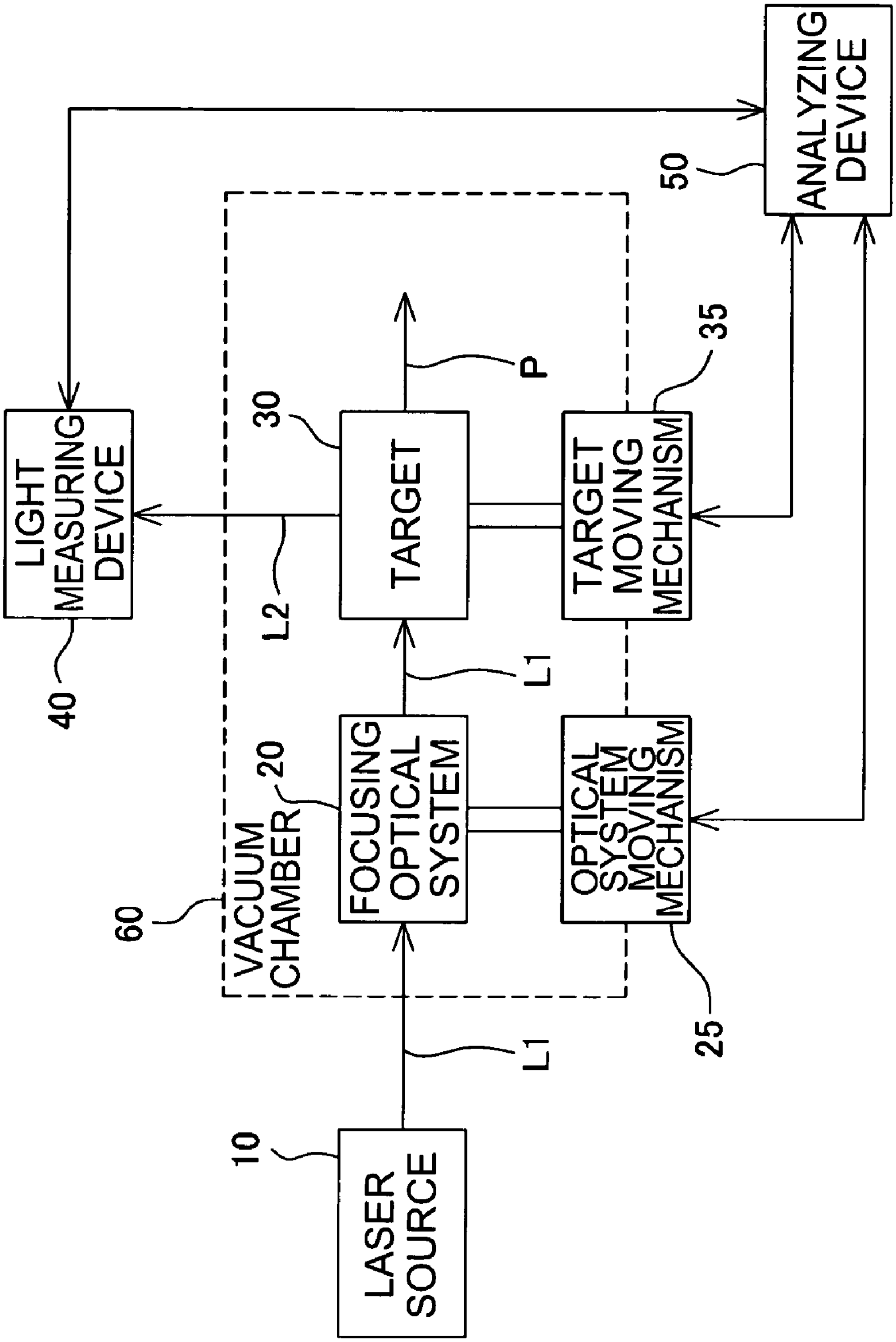
FIG. 1 is a block diagram schematically showing a configuration of an embodiment of the fast particle generating apparatus.

A preferred embodiment of the fast particle generating apparatus according to the present invention will be described below in detail with the drawings. Identical elements will be denoted by the same reference symbols in the description of drawings, without redundant description. It is noted that dimensional ratios in the drawings do not always coincide with those in the description.

FIG. 1 is a block diagram schematically showing a configuration of an embodiment of the fast particle generating apparatus according to the present invention. The fast particle generating apparatus of the present embodiment is a device for generating fast particles such as electrons, protons, deuterons, or other ions, and is equipped with laser source 10, focusing optical system 20, and target 30. Light measuring device 40 and analyzing device 50 are installed with respect to the target 30.

The laser source 10 is a light source unit for emitting a laser beam L1 with a predetermined wavelength and predetermined intensity to be used in generation of fast particles. This laser beam L1 is preferably a pulsed laser beam such as an ultrashort pulsed laser beam with high peak power. The target 30 is a source for generating fast particles P and is made of a predetermined material selected in accordance with a type of particles to be generated or the like. This target 30 is installed in vacuum chamber 60 maintained at a predetermined vacuum.

The focusing optical system 20 is set between laser source. 10 and target 30. The laser beam L1 outputted from the laser source 10 is projected onto the target 30 while being focused by the focusing optical system 20. Then this in-focus irradiation with the laser beam L1 results in generating fast particles P in the target 30 and emitting them to the outside. On this occasion, the target material is changed into a plasma in the target 30 upon irradiation with the laser beam L1, so as to induce plasma emission L2 at a wavelength different from that of the laser beam L1.

The light measuring device 40 and analyzing device 50 are installed with respect to the plasma emission L2 from the target 30 upon irradiation with the laser beam L1. The light measuring device 40 measures light L2 generated in the target 30 with the plasma emission, and outputs a measurement signal indicating the measurement result. The measurement signal from the light measuring device 40 is fed to the analyzing device 50.

The analyzing device 50 analyzes the focus state of the laser beam L1 on the target 30 and the generation state of fast particles P thereby, based on the measurement signal fed from the light measuring device 40. Specifically, the analyzing device 50 evaluates the intensity, wavelength spectrum, etc. of the light L2 from the target 30 measured by the light measuring device 40, and performs an analysis to assess the generation state of fast particles P with use of the result. Then the analyzing device 50 outputs a control signal for feedback control on the generation state of fast particles P through control of each part of the apparatus, such as the target 30 and the focusing optical system 20, in accordance with the analysis result.

In the present embodiment, optical system moving mechanism 25 and target moving mechanism 35 are installed for the focusing optical system 20 and for the target 30, respectively. The control signal from the analyzing device 50 is fed to each of the moving mechanisms 25, 35. The optical system moving mechanism 25 controls positioning and movement of the focusing optical system 20 in accordance with the control signal from the analyzing device 50. The target moving mechanism 35 controls positioning and movement of the target 30 in accordance with the control signal from the analyzing device 50. This results in feedback control on the generation state of fast particles P in the target 30, based on the monitor result by the light measuring device 40.

The effect of the fast particle generating apparatus in the above embodiment will be described below.

In the fast particle generating apparatus shown in FIG. 1, the laser beam L1 from the laser source 10 is projected in focus on the target 30 to generate the fast particles P and, at the same time, the light measuring device 40 measures the light L2 generated in the target 30 with the plasma emission caused thereby.

Here the light L2 resulting from such plasma emission varies depending upon the focus state of the laser beam L1 on the target 30 and the generation state of fast particles P. For example, the higher the focus density of the laser beam L1 on the target 30, the larger the intensity of the plasma emission L2 generated. In addition, the wavelength (color) of the plasma emission L2 varies depending upon the energy state of the plasma generated in the target 30.

Therefore, by measuring the light L2 from the target 30 by means of the light measuring device 40 and monitoring the emission intensity and emission wavelength (emission color), it is feasible to monitor the generation state, e.g., the amount of fast particles P generated in the target 30 in real time. Then the feedback control of the generating apparatus is performed through the analyzing device 50 and the moving mechanisms 25, 35 by making use of the monitor result, whereby it becomes feasible to efficiently generate the fast particles P on a stable basis.

A specific feedback control method on the generation state of fast particles P can be selected from various methods according to the configuration and use of the fast particle generating apparatus. For example, where the intensity of fast particles P is significant, the feedback control is performed so as to obtain stronger plasma emission. In another case where an energy distribution or the like of fast particles P is significant, the feedback control is performed so as to obtain an optimal emission spectrum.

The focusing optical system 20 installed between laser source 10 and target 30 is placed together with the target 30 in the vacuum chamber 60 in FIG. 1, but this focusing optical system 20 may also be located in part or in its entirety outside the vacuum chamber 60.

Figure 2:
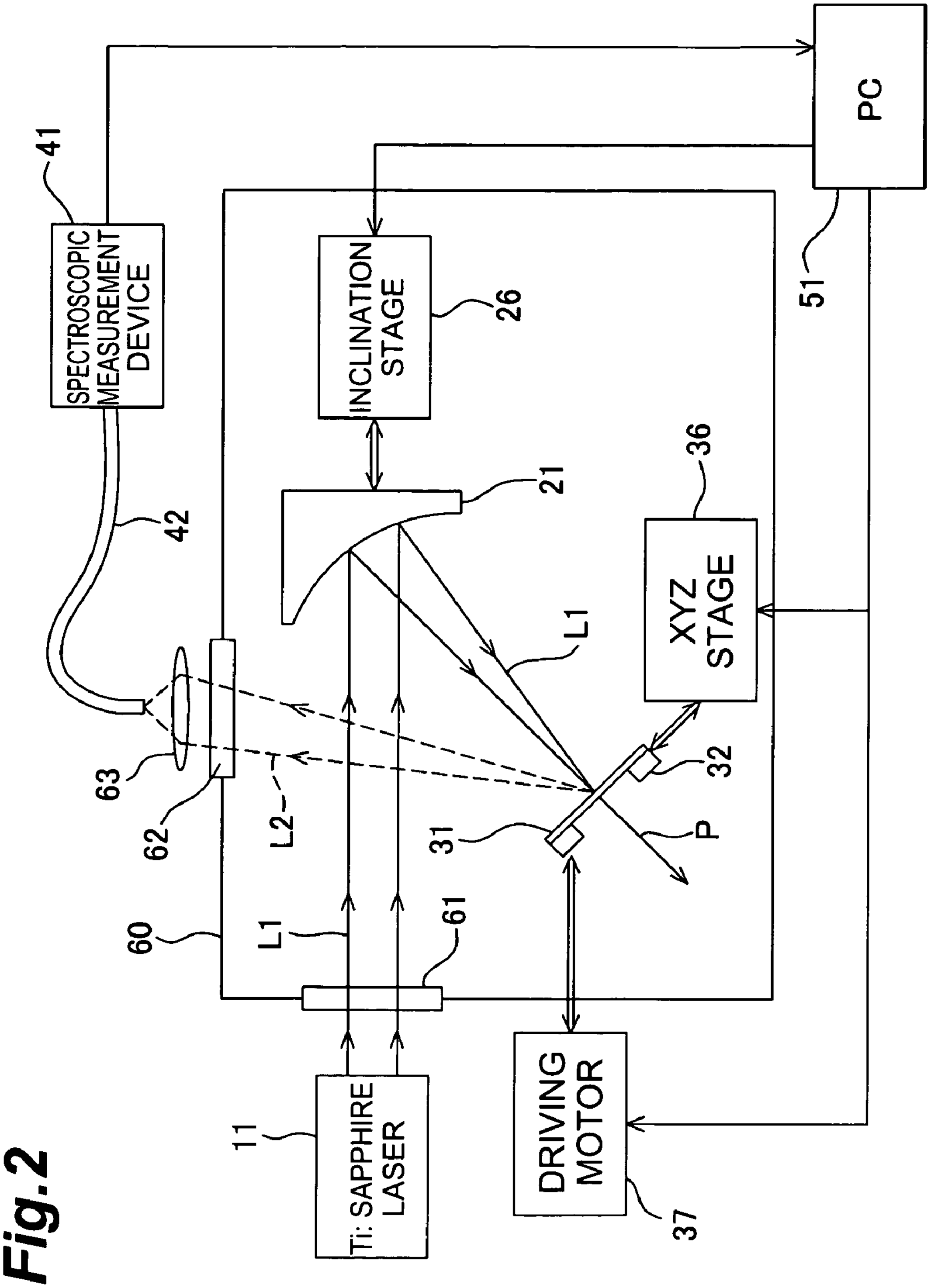
FIG. 2 is a configuration diagram showing a specific example of the fast particle generating apparatus shown in FIG. 1.

FIG. 2 is a configuration diagram showing a specific example of the fast particle generating apparatus shown in FIG. 1. The configuration of this fast particle generating apparatus will be described below with reference to FIGS. 1 and 2.

In the present example, Ti: sapphire laser 11 is used as the high-intensity laser source 10, and a pulsed laser beam with the wavelength of 800 nm, the pulse width of 50 fs, the output power of 100 mJ, and the peak output of 2 TW outputted from the Ti: sapphire laser 11 is used as the laser beam L1 for generation of fast particles. As the target 30, target film 31 made of a predetermined target material is set in the vacuum chamber 60. The target material is, for example, aluminum film, CH film (e.g., in the thickness of 1.5 to 20 μm), or the like. The target film 31 is held by target holder 32.

As the focusing optical system 20 for focusing the laser beam L1, for example, off-axis parabolic mirror 21 is set at a predetermined position in the vacuum chamber 60 evacuated to not more than the vacuum of $1\times10^{-6}$ Torr ($1.33\times10^{-4}$ Pa). The use of off-axis parabolic mirror 21 permits the laser beam L1 to be suitably focused at the predetermined position on the target film 31. At this time, for example, the focus density of $1\times10^{18}$ W/cm$^2$ is achieved. The external wall part of the vacuum chamber 60 between the Ti: sapphire laser 11 located outside the vacuum chamber 60, and the off-axis parabolic mirror 21 is a glass window 61 which transmits the laser beam L1.

The laser beam L1 outputted from the laser 11 travels through the glass window 61 to enter the interior of the vacuum chamber 60, and is then reflected by the off-axis parabolic mirror 21. Then the laser beam L1 reflected by the off-axis parabolic mirror 21 is projected onto the target film 31 while being focused, whereupon fast particles P are generated and emitted from the target film 31. If the high-intensity laser beam from the laser 11 should be focused in air, air would be converted into a plasma, so as to fail to achieve the high focus density; however, as long as the target film 31 is placed in vacuum chamber 60 as described above, this problem will not arise.

The plasma emission L2 generated in the target film 31 upon in-focus irradiation with the laser beam L1 spreads in the vacuum chamber 60 to be emitted to the outside. In connection therewith, a glass window 62 transmitting the plasma emission L2 is provided at a predetermined position in the external wall of vacuum chamber 60. Spectroscopic measurement device 41 having optical fiber 42 for input of light is installed as the light measuring device 40 for measuring the plasma emission L2, outside the vacuum chamber 60.

Part of the plasma emission L2 generated in the target film 31 travels through the glass window 62 to be emitted to the outside of the vacuum chamber 60. The emitted light L2 is focused on an input end of optical fiber 42 by condensing lens 63 and is thus guided through the optical fiber 42 into the spectroscopic measurement device 41.

The spectroscopic measurement device 41 is a spectrometer having a spectroscopic element such as a prism or a diffraction grating for spectroscopically decomposing light, and a photodetector for detecting light components spectroscopically decomposed, and it measures the spectral intensity with respect to the wavelength of the plasma emission L2 fed through the optical fiber 42 and outputs a measurement signal. By using such a spectrometer, it is feasible to securely monitor the generation state of fast particles in the target. The measurement signal from this spectroscopic measurement device 41 is fed into a personal computer (PC) 51 which is the analyzing device 50 for analyzing the generation state of fast particles P.

In the present embodiment, electric inclination stage 26 is provided as the optical system moving mechanism 25 with respect to the off-axis parabolic mirror 21. The inclination stage 26 controls the inclination of the off-axis parabolic mirror 21 relative to the optic axis of the laser beam L1, thereby controlling the focus state of the pulsed laser beam L1 with respect to the target film 31. In addition, electric XYZ stage 36 and driving motor 37 are provided as the target moving mechanism 35 for the target film 31 held by the target holder 32. The driving motor 37 is located outside the vacuum chamber 60 as shown in FIG. 2.

Figure 3:
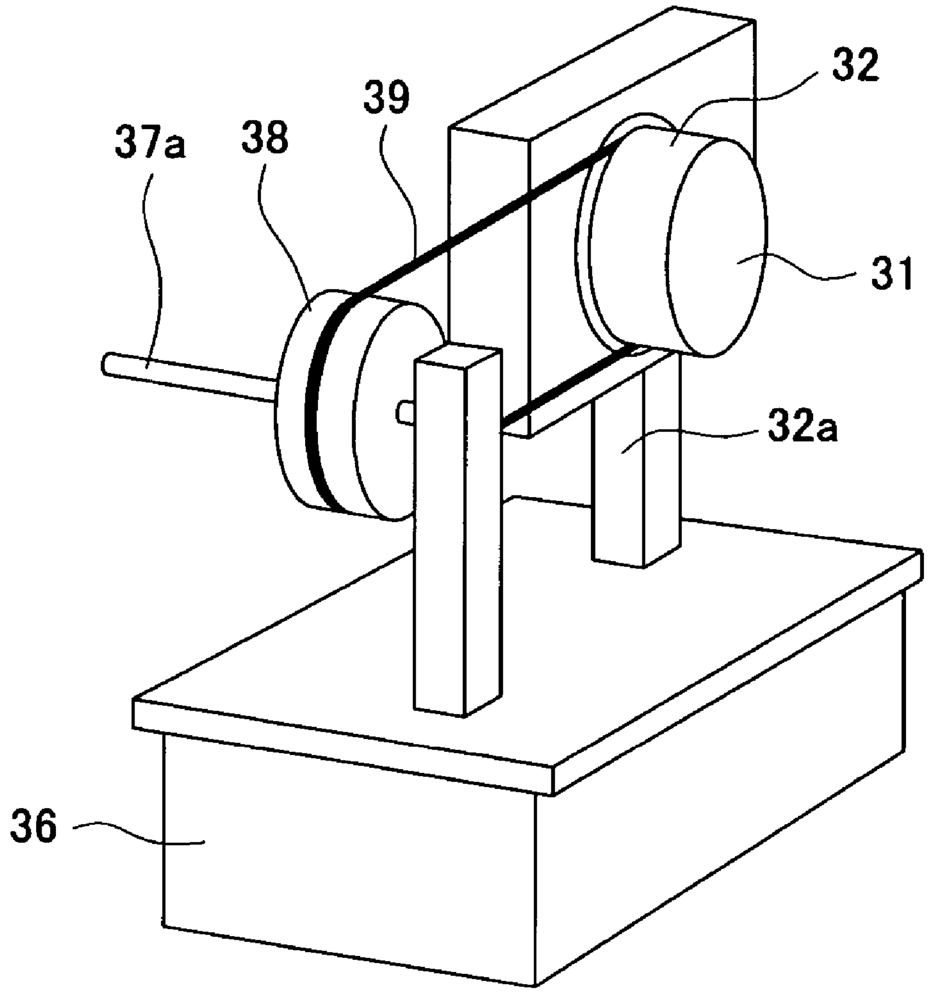
FIG. 3 is a perspective view showing a specific configuration of a target moving mechanism used in the fast particle generating apparatus shown in FIG. 2.

FIG. 3 is a perspective view showing a specific configuration of the target moving mechanism used in the fast particle generating apparatus shown in FIG. 2. The target film 31 and target holder 32 are fixed through support 32*a* on XYZ stage 36. The target holder 32 has a hollow bearing and is rotatable through belt 39. The XYZ stage 36 controls the position in the X-direction, Y-direction (horizontal direction), and Z-direction (vertical direction), thereby controlling positioning and movement of the target film 31 relative to the laser beam L1. The driving motor 37 rotates rotating ring 38 connected to the driving motor 37 (cf. FIG. 2) by rotational axis 37*a*, and rotates the target holder 32 and target film 31 through belt 39.

PC 51 analyzes the generation state of fast particles P in the target film 31, based on the measurement signal from the spectroscopic measurement device 41, and outputs a control signal according to the analysis result. The inclination stage 26 mechanically controls the movement of the off-axis parabolic mirror 21 in accordance with the control signal fed from PC 51. The XYZ stage 36 and driving motor 37 mechanically control the movement of target holder 32 and target film 31 in accordance with the control signal fed from PC 51. This results in feedback control on the generation state of fast particles P in the target film 31.

The fast particle generating apparatus according to the present invention is not limited to the above embodiment and example, but can be modified in various ways. For example, the focusing optical system 20 for guiding the laser beam L1 from the laser source 10 onto the target 30 may be a condensing lens or the like instead of the off-axis parabolic mirror, or may be a combination of optical elements.

FIG. 1 shows the configuration comprising the optical system moving mechanism 25 for the focusing optical system 20 and the target moving mechanism 35 for target 30, as the control means for performing the feedback control on the generation state of fast particles P in the target 30. This enables easy control on the focus state of laser beam L1 on the target 30. However, these control means may be any other control means without having to be limited to the mechanical moving mechanisms.

The control means may also be configured so that there is provided a control means for controlling the output condition of laser beam L1 for the laser source 10 and it performs feedback control. In general, if there is provided a control means for controlling at least one of the laser source, the target, and the focusing optical system, the feedback control on the generation state of fast particles in the target can be implemented in cooperation with the light measuring device 40 and analyzing device 50.

INDUSTRIAL APPLICABILITY

As detailed above, the fast particle generating apparatus according to the present invention is applicable as a fast particle generating apparatus capable of monitoring the generation state of fast particles and thereby efficiently generating fast particles. Namely, by adopting the configuration wherein the fast particles are generated by projecting the laser beam from the laser source onto the target while focusing it by the focusing optical system and wherein the light measuring means measures the emission from the target upon the in-focus irradiation with the laser beam, it is feasible to monitor the generation state, e.g., the amount of fast particles generated, in real time. By performing the feedback control of the generating apparatus based on the analysis of the monitor result by the analyzing means, it becomes feasible to efficiently generate the fast particles on a stable basis.

The invention claimed is:

1. A fast particle generating apparatus comprising:

a laser source for emitting a laser beam at a predetermined intensity;

a target for generating and emitting fast particles when irradiated with the laser beam in focus thereon;

a focusing optical system for focusing the laser beam emitted from the laser source, on the target;

light measuring means for measuring light generated in the target upon irradiation with the laser beam and outputting a measurement signal;

analyzing means for performing an analysis on a generation state of the fast particles in the target, based on the measurement signal from the light measuring means; and control means for controlling at least one of the laser source, the target, and the focusing optical system on the basis of a result of the analysis by the analyzing means, thereby controlling the generation state of the fast particles in the target.

2. The fast particle generating apparatus according to claim 1, wherein the control means is a moving mechanism for controlling movement of the target or the focusing optical system.

3. The fast particle generating apparatus according to claim 1, wherein the focusing optical system has an off-axis parabolic mirror.

4. The fast particle generating apparatus according to claim 1, wherein the light measuring means has a spectrometer for spectroscopically measuring the light generated in the target.

* * * * *